United States Patent [19]

Gerhart

[11] Patent Number: 4,860,280
[45] Date of Patent: Aug. 22, 1989

[54] APPARATUS AND METHOD FOR A SECURE AND DIAGNOSABLE ANTIJABBER COMMUNICATION CIRCUIT

[75] Inventor: Paul B. Gerhart, Horsham, Pa.

[73] Assignee: Honeywell Inc., Minneapolis, Minn.

[21] Appl. No.: 121,548

[22] Filed: Nov. 17, 1987

[51] Int. Cl.$^4$ .............................. H04J 1/16; H04J 3/14
[52] U.S. Cl. ......................................... 370/13; 370/85; 340/825.5
[58] Field of Search ....................... 370/85, 88, 89, 95, 370/13, 96; 340/825.5, 825.51

[56] References Cited

U.S. PATENT DOCUMENTS

| 4,680,581 | 7/1987 | Kozlik et al. | 370/85 |
| 4,692,919 | 9/1987 | West Jr. | 370/96 |
| 4,700,344 | 10/1987 | Kaino et al. | 370/94 |
| 4,701,910 | 10/1987 | Ulug | 370/85 |

Primary Examiner—Douglas W. Olms
Assistant Examiner—Wellington Chin
Attorney, Agent, or Firm—William W. Holloway; Donald J. Lenkszus; Arthur A. Sapelli

[57] ABSTRACT

In order to prevent 'jabber', the uncontrolled transmission of messages on a communication channel, an antijabber timing unit is frequently used to determine whether a message on the communication channel exceeds the maximum permitted length of time. The present invention provides testing apparatus to determine when the antijabber timing unit is functioning accurately. In addition, protection is provided so that the testing apparatus does not compromise the function of the antijabber timing unit during subsequent message transmission. The antijabber timing unit is also used as part of the enable function for the transmission of messages over a channel to prevent the failure of a single component from resulting in inadvertent transmission of information.

17 Claims, 3 Drawing Sheets

APPARATUS AND METHOD FOR A SECURE AND DIAGNOSABLE ANTIJABBER COMMUNICATION CIRCUIT

BACKGROUND OF THE INVENTION

1. Field of the invention

This invention relates generally to networks that receive and transmit groups of logic signals from remote locations and, more particularly, to apparatus for insuring the accuracy of the information transmitted between the local and the remote locations.

2. Description of the Related Art

In the automatic control of processes, process control networks are provided to collect status information for use by at least one central location and to distribute control signals to the devices coupled to the network. Referring to FIG. 1, a portion of such a process control network is shown. The process control network includes a system bus 5 which has at least one central control unit 6 coupled thereto and at least one bus interface module 9 also coupled thereto. The central control unit 6 receives signals from the system bus 5, signals that typically communicate the status of user devices coupled to the process control network and applies signals to the network that provides the control signals determining the operation of the user devices. The bus interface module 9 applies status signals to the system bus and receives signals from the system bus 5 which are relevant to a subset of network user devices 10 that communicate with the central control unit 6 through bus interface module 9. User devices 10, (such as motors, lamps and heaters), responsive to digital signals, receive digital control signals through device interface unit 16 and digital output module 12 from the bus interface module 9. User devices 10, generating digital status signals in response to contact closures, transmit the status signals to the bus interface module 9 by means of device interface unit 17 and digital input module 13. User devices 10, (such as control valves), responding to analog control signals, receive signals from the bus interface module 9 by means of analog output module 14 and device interface unit 18. User devices 10, (such as flowmeters, level detectors, pressure meters etc.), of the type generating analog status information transmit the status signals to the bus interface module 9 through device interface unit 19 and analog input module 15. The device interface units 16, 17, 18 and 19 convert the signals received from and transmitted to the user devices into a format usable by the digital output and input modules and the analog output and input modules, respectively. The digital input and output modules 13 and 12 and the analog input and output modules 15 and 14 couple the signals of the user devices, as transformed by the device interface unit, with the bus interface module 9 by means of local bus 11.

In the communication between the bus interface module 9 and the digital and analog input and output devices, the messages typically have an upper bound on the time that a single message can be active (in the preferred embodiment, the upper limit is 10 milliseconds [ms], however, this interval is a matter of design choice). A malfunction in the network can result in uncontrolled communication of information, generally referred to as jabber, in which the message can extend beyond the single message boundary. Because the jabber is the result of a malfunction, such a condition must be detected and the network repaired or inactivated. The detection of a jabber event is typically performed by an antijabber timing unit which measures the duration of the message. However, the antijabber circuit can itself malfunction and not detect a jabbering incident. Furthermore, in process control networks of the related art, a jabber incident can be the result of a single component malfunction.

A need has therefore been felt for apparatus and an associated method that can verify the operation of the antijabber timing circuit without compromising the normal communication operation, and which can assist in isolating a malfunction that could result in a jabber event, the jabber event resulting in interruption of communication on the network beyond the immediate consequence of the malfunction.

FEATURES OF THE INVENTION

It is an object of the present invention to provide an improved process control network.

It is a feature of the present invention to provide an improved process control network in which specified network malfunctions are identified.

It is another feature of the present invention to provide an improved process control network having an antijabber circuit.

It is still another feature of the present invention to provide an improved process control network having the capability of testing an antijabber circuit.

It is yet another feature of the present invention to provide an exchange of signals on a process control network wherein failure of a single component in the associated process control network does not result in a jabber event.

SUMMARY OF THE INVENTION

The aforementioned and other features are accomplished, according to the present invention, by providing a microprocessor unit with the capability of applying a timing signal to the antijabber timing unit. The timing signal has a duration longer than the maximum permitted message duration. When the antijabber circuit is functioning properly, a failure signal is transmitted to the microprocessor. In the event of a malfunction in the antijabber circuit, the microprocessor will detect that no failure signal was received as a result of the timing signal and appropriate response can be taken. A signal is applied to the properly functioning antijabber to remove the failure signal and apparatus is provided to insure that the removal of the failure signal does not compromise the network communication. The antijabber circuit is also used to supply a second enable signal for the network to minimize the opportunity for a single component to result in a jabber event.

These and other features of the present invention will be understood upon reading of the following description along with the drawings.

DESCRIPTION OF THE PREFERRED EMBODIMENT

1. Detailed Description of the Figures

Figure 1:
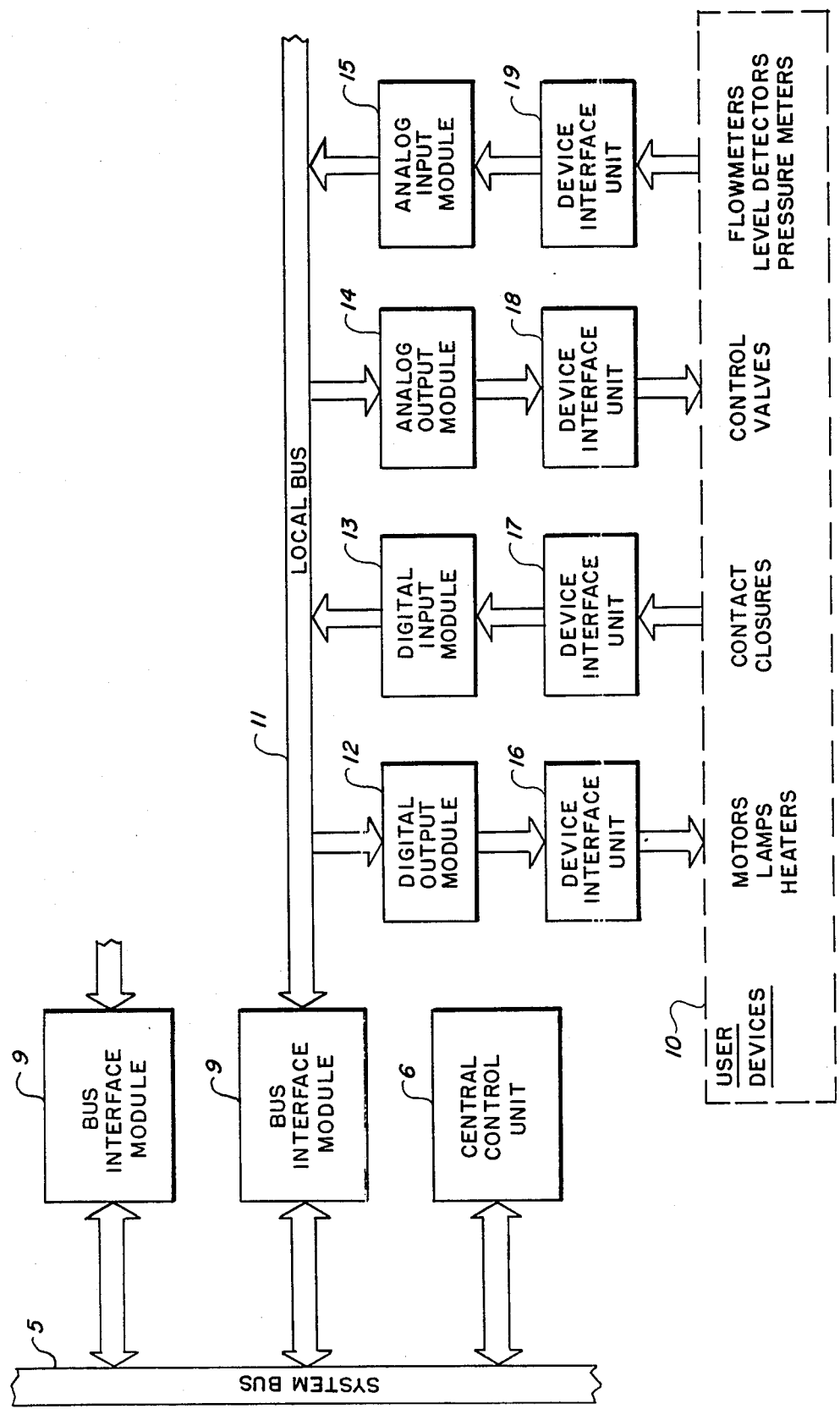
FIG. 1 is a block diagram of a process control network capable of using the present invention.

FIG. 1 has been described with reference to the related art.

Figure 2:
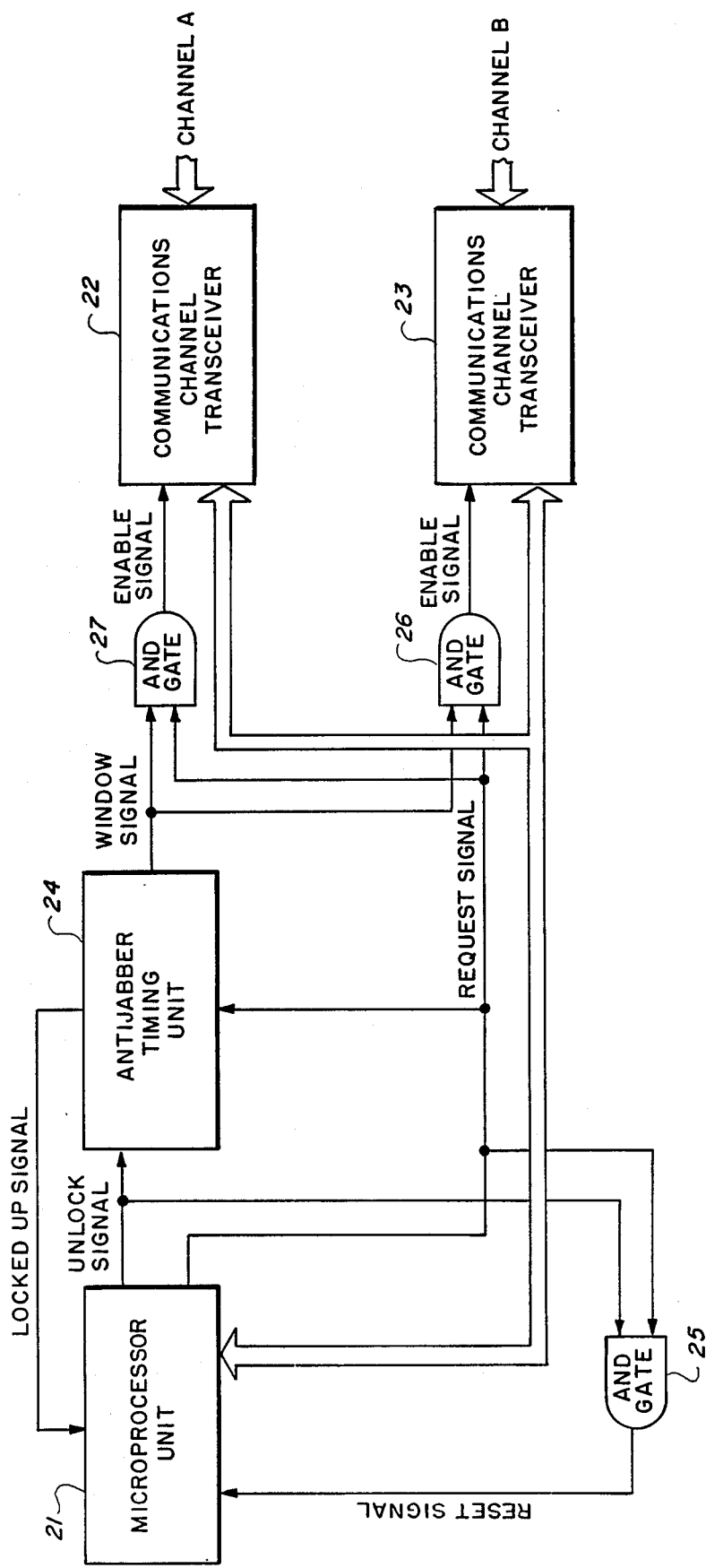
FIG. 2 is a block diagram of the principal components of the apparatus for testing an antijabber timing unit.

Referring now to FIG. 2, the apparatus for testing the antijabber circuit is illustrated. Logic signal groups are exchanged between the microprocessor unit 21 and the communication channel transceivers 22 and 23 when the communications channel transceivers 22 or 23 are enabled. The microprocessor unit 21 applies an UNLOCK signal to antijabber timing unit 24 and to a second input terminal of logic 'AND' gate 25 and applies a REQUEST signal to the antijabber timing unit 24 and to a first terminal of logic 'AND' gate 27, to a first input terminal of logic 'AND' gate 26 and to a first terminal of logic 'AND' gate 25. The microprocessor receives a LOCKED UP signal from antijabber timing unit 24 and a RESET signal from an output terminal of logic 'AND' gate 25. An output window signal from antijabber timing unit 24 is applied to a second input terminal of logic 'AND' gate 27 and to a second input terminal of logic 'AND' gate 26. The logic 'AND' gate 27 applies an ENABLE signal to communication channel transceiver 22 and logic 'AND' gate 26 applies an ENABLE signal to communication channel tranceiver 23. Communication channel transceivers 22 and 23 exchange signal groups with the remainder of the process control network.

Figure 3:
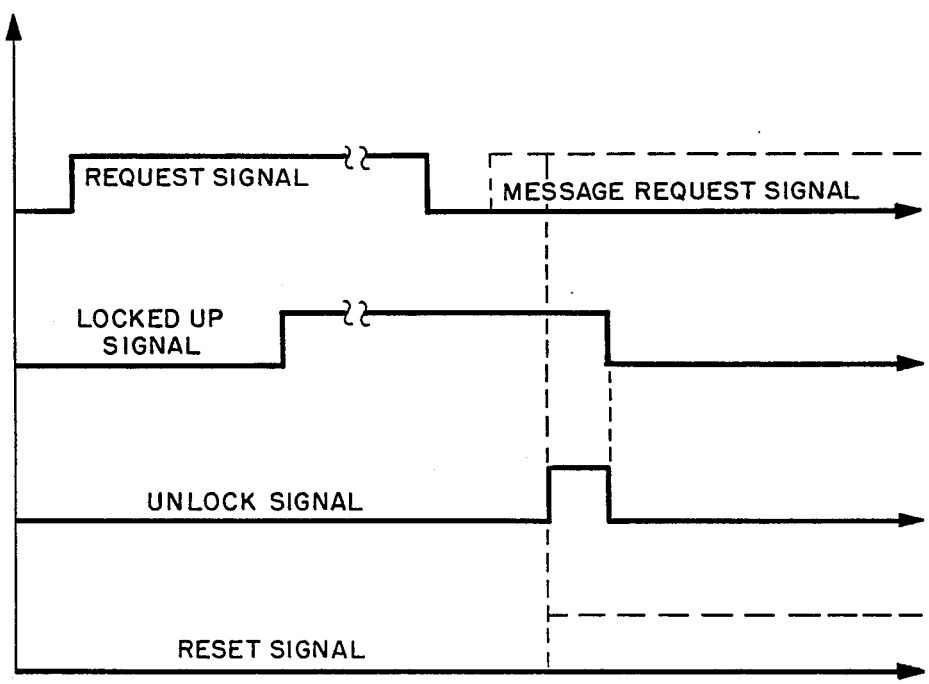
FIG. 3 is a timing diagram illustrating the relationship of the important signals used for testing the antijabber timing unit.

Referring next to FIG. 3, the relationship of principal signals of the preferred embodiment are shown. As timing or REQUEST signal is generated by the microprocessor unit 21 and applied to antijabber timing unit 24. After a period of time that exceeds the maximum period permitted for a message, the antijabber timing unit provides a LOCKED UP signal indicating that the antijabber timing unit has detected a message that exceeds the maximum permitted length. In response to the LOCKED UP signal, applied to the microprocessor, the microprocessor applies an UNLOCK signal to the antijabber timing unit 24. Although the original REQUEST signal is inactivated prior to generation of the UNLOCK signal, a current REQUEST signal related to an actual message transmission, can be present. The combination of a REQUEST signal and an UNLOCK signal causes the microprocessor to be reset by a RESET signal regardless of the state of the LOCKED UP signal.

2. Operation of the Preferred Embodiment

The present invention makes use of the processing capability of a microprocessor unit used for transmission of messages over the network to provide a timing signal and determine if, as a result of the timing signal, the antijabber timing unit is functioning correctly. Because the timing signal exceeds the maximum permitted message length, when a LOCKED UP (failure) signal is not generated as a result of the timing signal, then the microprocessor unit responds to a antijabber timing unit malfunction. When a LOCKED UP signal is generated by the antijabber timing unit, the microprocessor responds with an UNLOCK signal to the antijabber unit that inactivates the LOCKED UP signal. Because the timing signal has been removed, a message REQUEST signal can be applied to the antijabber unit. To prevent the UNLOCK signal from impacting the operation of a message transmission, the simultaneous presence of an UNLOCK signal and a message REQUEST signal results in the resetting of the microprocessor unit, i.e., any activity in progress will be aborted and reinitiated.

Referring once again to FIG. 2, an important feature of the present invention is illustrated. The ENABLE signal for the communication channel transceiver 22 from logic 'AND' gate 27 and the ENABLE signal for the communication channel transceiver 23 from logic 'AND' gate 26 are activated by two signals, one from the microprocessor unit 21 and one (the WINDOW signal) from the antijabber timing unit. Thus, a component malfunction that would normally result in a jabber incident is prevented from so doing because of the presence of the second activation component. The WINDOW signal is present when the LOCKED UP signal is not present, when a REQUEST signal is present and when the REQUEST signal has been active for less than the maximum signal transmission time.

It will be clear that, although the preferred embodiment uses the processing capability of a microprocessor unit, the same antijabber timing unit testing can be performed by dedicated apparatus.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for preventing uncontrolled communication in a process control network, said apparatus comprising:
    microprocessor means for providing a REQUEST signal, said REQUEST signal being generated during transmission of data signals by said microprocessor means and being generated during a test procedure; and
    antijabber means responsive to said REQUEST signal for providing a LOCKED UP signal to said microprocessor means when said REQUEST signal exceeds a predetermined length, said LOCKED UP signal preventing transmission of data signals by said microprocessor means, said LOCKED UP signal causing said microprocessor means to apply an UNLOCK signal to said antijabber means after said REQUEST signal is removed during said test procedure, said UNLOCK signal causing microprocessor means to cancel said LOCKED UP signal, wherein said microprocessor means prevents transmission of data signals when said LOCKED UP signal is not generated during said test procedure.

2. The apparatus for preventing uncontrolled communication in a process control network of claim 1 further comprising logic means responsive to a simultaneous presence of said UNLOCK signal and said REQUEST signal to provide a RESET signal, said RESET signal being applied to said microprocessor means and causing said microprocessor means to halt operation and be reset.

3. The apparatus for preventing uncontrolled communication in a process control network of claim 2 wherein said logic means includes a logic AND gate having said UNLOCK signal applied to a first terminal and having said REQUEST signal applied to a second input terminal, wherein said logic AND gate provides said RESET signal to said microprocessor means when a REQUEST and an UNLOCK signal are simultaneously present.

4. The apparatus for preventing uncontrolled communication in a process control network of claim 3 wherein said REQUEST signal is an activation signal for permitting data signals to be transmitted to said process control network.

5. The apparatus for preventing uncontrolled communication in a process control network of claim 4 further comprising isolation means for reducing effects of single component failure on transmission of data signal over said process control network by providing a plurality of enabling signals for each of a plurality of communication channels.

6. The apparatus for preventing uncontrolled communication in a process control network of claim 5 wherein said isolation means includes signal means in said antijabber means for generating a WINDOW signal when said LOCKED UP signal is not present, wherein said REQUEST signal and said WINDOW signal enable communication from said microprocessor unit to said process control network.

7. Apparatus for preventing uncontrolled communication over a process control network, said apparatus comprising:
    microprocessor means for communicating data signals to said process control network;
    antijabber timing means for applying a LOCKED UP signal to said microprocessor unit when said communicating data signals with said microprocessor means exceed a predetermined length of time, said LOCKED UP signal preventing said communicating data signals; and
    testing means for verifying operation of said antijabber timing means, said testing means including first means in said microprocessor means for generating said REQUEST signal longer than said predetermined length of time during a test procedure, wherein said antijabber timing means provides said LOCKED UP signal after said predetermined length of time.

8. The apparatus for preventing uncontrolled communication over a process control network of claim 7 wherein said microprocessor means includes second means for identifying an antijabber timing means malfunction when said LOCKED UP signal is not generated during said test procedure.

9. The apparatus for preventing uncontrolled communication over a process control network of claim 8 wherein said testing means includes third means in said microprocessor means for providing an UNLOCK signal to said antijabber timing means when LOCKED UP signal is generated in response to said REQUEST signal during said test procedure, said UNLOCK signal causing said LOCKED UP signal to be removed by said antijabber timing means.

10. The apparatus for preventing uncontrolled communication over a process control network of claim 9 wherein said UNLOCK signal is applied to said antijabber timing means after said REQUEST signal has been removed during said test procedure.

11. The apparatus for preventing uncontrolled communication over a process control network of claim 10 further comprising logic means responsive to a simultaneous presence of said UNLOCK signal and REQUEST activation signal for applying a RESET signal to said microprocessor means, said RESET signal causing said microprocessor means to halt operation and to be reinitialized.

12. The apparatus for preventing uncontrolled communication over a process control network of claim 11 wherein said UNLOCK signal is generated after said REQUEST signal is removed in said test procedure.

13. The apparatus for preventing uncontrolled communication over a process control network of claim 12 further comprising enabling means, said enabling means including signal generating means associated with said antijabber means, said signal generating means providing a WINDOW signal, said WINDOW signal and said REQUEST signal enabling said communicating data signals with said microprocessor means.

14. A method for preventing uncontrolled communication over a process control network, said method comprising the steps of:
    generating REQUEST signal when a microprocessor unit transmits data signals to said process control network;
    applying said REQUEST signal to an antijabber timing unit;
    generating a LOCKED UP signal by said antijabber timing unit when REQUEST signal associated with said data signals exceeds a predetermined period;
    applying said LOCKED UP signal to said microprocessor unit, said LOCKED UP signal identifying a jabber event;
    periodically generating a test REQUEST signal exceeding said predetermined period, said test REQUEST signal being applied to said antijabber timing unit;
    generating an UNLOCK signal by said antijabber timing circuit when a LOCKED UP signal is generated in response to said test REQUEST signal and applying said UNLOCK signal to said microprocessor unit, wherein said LOCKED UP signal is removed in response to said UNLOCK signal; and
    preventing transmission of data groups to said process control network by said microprocessor unit when said LOCKED UP signal is not generated in response to said test REQUEST signal.

15. The method for preventing uncontrolled communication over a process control network of claim 14 further comprising the step of reinitiating transmission of data groups by said microprocessor unit when said test REQUEST signal and said UNLOCK signal are simultaneously present.

16. The method for preventing uncontrolled communication over a process control network of claim 15 further comprising the step of generating a WINDOW signal by said antijabber timing circuit when said LOCKED UP signal is not present, said WINDOW signal providing a separate signal for enabling transmission of said data signals to said process control network.

17. The method for preventing uncontrolled communication over a process control network of claim 16 further comprising the step of generating UNLOCK signal after removal of said REQUEST signal.

* * * * *